US006811482B2

(12) United States Patent
Letovsky

(10) Patent No.: US 6,811,482 B2
(45) Date of Patent: Nov. 2, 2004

(54) VIDEO GAME OF CHANCE APPARATUS

(76) Inventor: Howard Letovsky, P.O. Box 1925, Willits, CA (US) 95490

(*) Notice: Subject to any disclaimer, the term of this patent is extended or adjusted under 35 U.S.C. 154(b) by 154 days.

(21) Appl. No.: 10/093,193

(22) Filed: Mar. 5, 2002

(65) Prior Publication Data

US 2003/0171144 A1 Sep. 11, 2003

(51) Int. Cl.[7] .................................. A63F 13/00

(52) U.S. Cl. .................................. 463/7; 463/33; 463/20

(58) Field of Search .................................. 463/1, 7, 16–22, 463/30–33, 38

(56) References Cited

U.S. PATENT DOCUMENTS

| | | | | |
|---|---|---|---|---|
| 4,593,904 A | | 6/1986 | Graves | |
| 4,695,053 A | | 9/1987 | Vazquez, Jr. et al. | |
| 5,342,049 A | | 8/1994 | Wichinsky et al. | |
| 6,050,895 A | * | 4/2000 | Luciano et al. | 463/7 |
| 6,267,669 B1 | * | 7/2001 | Luciano et al. | 463/7 |
| 6,409,597 B1 | * | 6/2002 | Mizumoto | 463/31 |
| 6,517,433 B2 | * | 2/2003 | Loose et al. | 463/20 |
| 6,522,312 B2 | * | 2/2003 | Ohshima et al. | 345/8 |
| 6,761,632 B2 | * | 7/2004 | Bansemer et al. | 463/16 |

* cited by examiner

*Primary Examiner*—Jessica Harrison
*Assistant Examiner*—Robert Mosser

(57) ABSTRACT

A gaming apparatus is disclosed that bridges the entertainment gap that currently exists between skill-based video game entertainment and the traditional formats of video games of chance. The present invention as described herein, provides a three dimensional software "world" as the gaming environment, and, through the incorporation of human interface devices, provides the player with the feeling of control experienced when playing a skill-based video game, while maintaining the random outcome requirements of standard video games of chance. In certain circumstances, the present invention may actually provide an element of control over the game outcome, but it is the feeling of control—not necessarily actual control—that provides the unique entertainment value. The present invention also provides a two-way video gaming apparatus for accommodating a plurality of players.

24 Claims, 4 Drawing Sheets

VIDEO GAME OF CHANCE APPARATUS

BACKGROUND

1. Field of Invention

This invention relates generally to video games and video games of chance. More specifically, the present invention relates to gaining devices that generate random combinations of symbols and provide a win indication if the random combination generated corresponds to one of a plurality of predetermined winning combinations, and also to video game devices wherein players may input control commands and interact directly with the game images. Further, the present invention also pertains to video entertainment and gaming systems that utilize a plurality of video terminals at remote player locations capable of interacting with each other through a central location.

2. Description of Prior Art

Games of chance are widely known in prior art. These devices include video and mechanical slot machines, video poker, video blackjack, and many other games of chance that use randomly generated images as the entertainment component of a game of chance.

Generally, slot gaming devices, whether mechanical or video style, are configured to present to a player three or more rotatable reels arranged side by side in a two dimensional plane. The outer peripheral surfaces of the reels have disposed thereon a series of symbols, such as a lemon, a plum, a bell, a melon, a star, a cherry, a bar, or the like. Video poker, and other card gaming devices, present a line of card images in a two-dimensional plane to the player in response to one or more button presses.

In both the mechanical and video type gaming devices, the player inserts a form of currency into the machine and activates the reels or the video display by pressing a button or pulling a handle located on the side of the machine. After the reels have stopped or after the video display has stabilized, a determination is made as to whether the combination of displayed symbols matches one of several predetermined combinations. If a match is sensed, the machine will produce a particular combination or payout of a number of tokens in relation to the odds that that particular combination will occur.

While these machines provide a good deal of excitement to the player in attempting to obtain a winning combination, the images cannot be interacted with by the player in any manner other than choosing a "deal" or "draw" option, or, in rare cases, a player is allowed to choose a preset image in a second level game that may provide a extra chance to win credits or currency.

Video game systems—as opposed to video gaming (games of chance) systems—provide skill-based entertainment, wherein the player is rewarded with points or credits following successful interaction with the game elements. First person shooting games are also well known in prior art in the video game industry. In these types of games, as in most current video games, the player is operating within a virtual three-dimensional world that adds tremendous realism to the experience. Games of chance have not previously incorporated virtual interactive three-dimensional game environment technology. The present invention incorporates and applies this level of realism to games of chance.

As disclosed in the following patents, herein incorporated by reference in their entirety, the basic premises of chance games, combined chance and skill, and multiple player chance games are disclosed. In U.S. Pat. No. 4,695,053, as issued to Vazquez, Jr., et al, a combination skill and chance based gaming device is disclosed that provides certain machine predetermined winning combinations of symbols in combination with others that are player selectable. In U.S. Pat. No. 5,342,049, as issued to Wichinsky, et al., A gaming machine is disclosed that combines a random selection feature with a skill feature to allow the player to utilize his ability to manipulate the skill feature to improve his chances of winning on the gaming machine. In U.S. Pat. No. 4,593, 904, as issued to Graves, a multiple player interactive gaming system is disclosed that allows players at remote gaming terminals to interact with an identical series of choices.

Since it is a requirement in most regulatory jurisdictions that games of chance not incorporate skill as a factor in determining the win or lose outcome of a game of chance, the degree of image targeting mechanical input command controls and the three dimensional game play characteristics incorporated in skill based video games have never been integrated into video games of chance.

The present invention combines key entertainment and interactive elements of skill based video games with the random image generation characteristics of games of chance, in a unique and novel way, to satisfy regulatory requirements, and simultaneously provide an enhanced game of chance entertainment experience. Further, The present invention provides a means to allow multi-player slot gaming.

OBJECTIVES AND SUMMARY OF THE PRESENT INVENTION

The objective of the present invention is to provide a gaming apparatus that incorporates the feeling of control that a player experiences when using the three dimensional environment and targeting features of a skill based video game, yet have the capability to maintain the random outcome requirements of standard video games of chance. In certain circumstances, the present invention may actually provide an element of control over the outcome, but it is the feeling of control—not necessarily actual control—that provides the unique entertainment value. The intent of the invention is to bridge the entertainment gap that currently exists between skill based video game entertainment and the traditional formats of video games of chance—resulting in a much broader demographic appeal for video games of chance.

The present invention as further described herein, may use a three dimensional software generated "world" as the gaming environment. At the start of each game, an array of randomly or fixedly spaced images may be created which could appear to the player as either fixed or moving "targets" that can be selected with a targeting control input device such as a touch screen, trackball, joystick, or other human interface device. When the player locks onto a target with said human interface device, and presses a button, or touches the screen to confirm said locked-on condition, a virtual projectile may be launched to impact the target, eliminating it from view and redisplaying said target to the player as one of a series of randomly generated images that may stop as a fixed image after a set period of time. The game play may then continue until a predetermined image, or sets of images are displayed. The layouts of said images may determine the win or loss outcome of the game. Further, if the player does not react to the targets in a predetermined time frame, the game software may automatically complete the game.

Another objective of the present invention is to provide a two-way video gaming apparatus for accommodating a plurality of players. Said gaming apparatus may include a central data processing station and a plurality of remote display gaming units. A two-way data link may be provided for connecting the central data processing station to the remote display gaming units. Each of the remote display gaming units may be capable of receiving image generation and position data from the data link and displaying a plurality of images in response to said data. A control means may be provided on each remote display gaming unit to allow a player to interact with the displayed images, and the results of said interactions may then be transmitted through the data link to the central data processing station. All these interactions may then be compared and a winner, or set of winners, may be selected based on the interactions and an established algorithm for winner selection. For example, the player who successfully fires virtual projectiles at the highest number of targets associated with his remote display unit may win the jackpot.

The above described objectives and many other features of the present invention will become better understood by reference to the following detailed description when taken in conjunction with the drawings.

DETAILED DESCRIPTION OF THE PREFERRED EMBODIMENT

Figure 1:
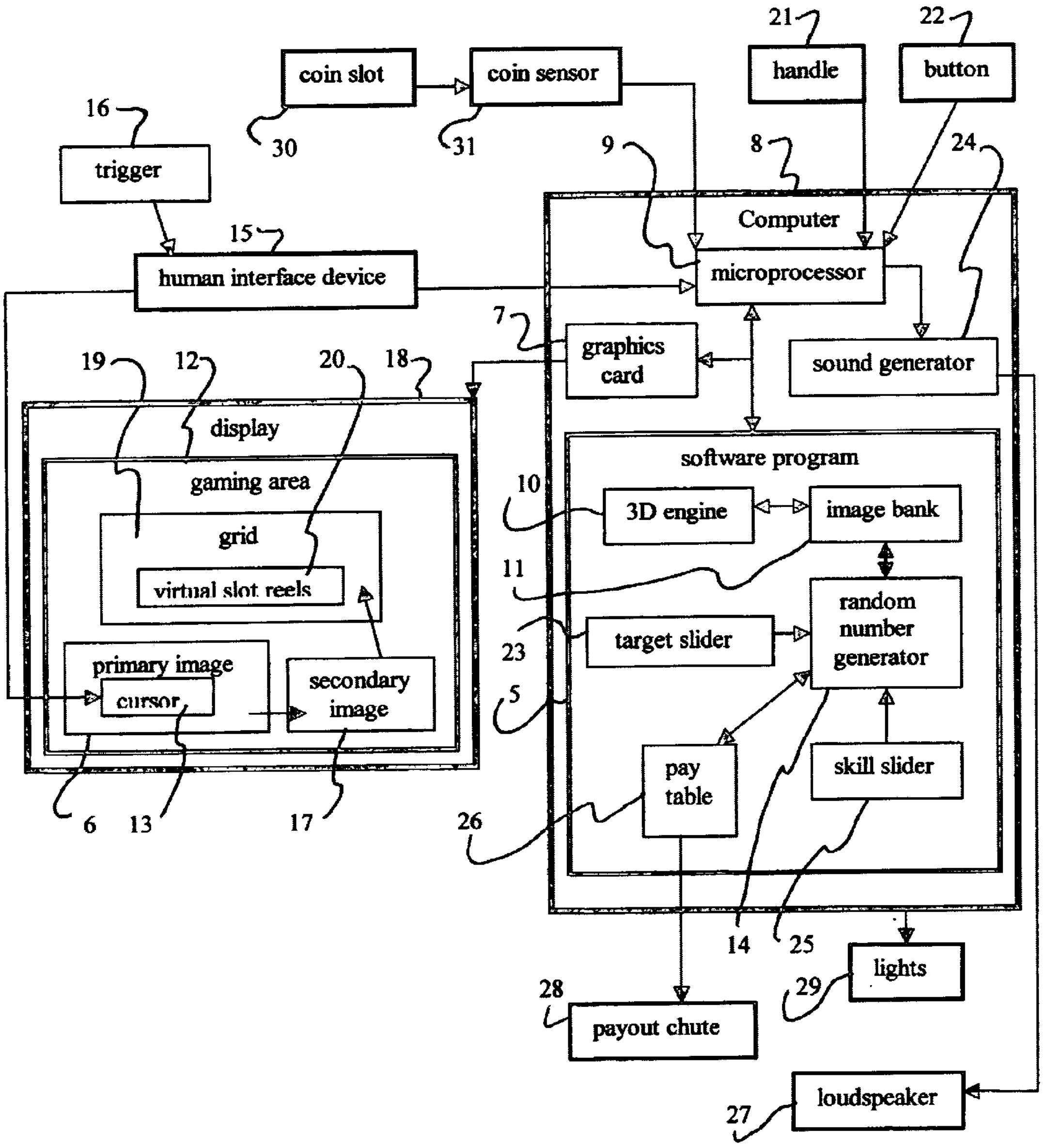
FIG. 1 is a logical block diagram of the software functions of the gaming apparatus according to the invention.

The preferred embodiment of the present invention is a gaming apparatus that provides improved levels of player interaction utilizing the software logic and hardware component flow chart as shown in FIG. 1. The invention utilizes the software program 5, configured to operate on a standard microprocessor based computer 8, well known in prior art, to generate a random combination of symbols used to define a plurality of winning combinations of symbols. Said computer 8 must be powerful enough to generate and calculate the required positions of images 6 within gaming area 12, as well as render gaining area 12. Any computer with at least a 500 mhz Celeron microprocessor 9 and one hundred and twenty eight megabytes of ram will do the job. It is also preferred that said computer utilize a PCI or an AGP graphics card 7 with at least thirty-two megabytes of ram to provide the optimum visual experience. This is not required for the software element of the invention to operate, but it is preferred.

"3D" engine 10 is utilized as an integral part of software program 5 to generate a three dimensional virtual world referred to herein as gaming area 12. There are numerous three-dimensional engines of this type capable of rendering gaming area 12, such as, Truevision, Quake, etc. that are well known in prior art, so there is no need to go into great detail herein. Software program 5 runs on microprocessor 9 within computer 8. Said software program 5 is configured to create computer graphic surfaces forming either a spherical or other three-dimensional gaming area 12 to define an enclosed virtual space. Computer 8 may also generate and display variable sized virtual three-dimensional worlds as said virtual three-dimensional world gaming area 12. Gaming area 12 is presented to a player on display means 18. Display means 18 may be a video monitor, a television, or any other electronic or mechanical means capable of displaying graphic images.

Figure 2:
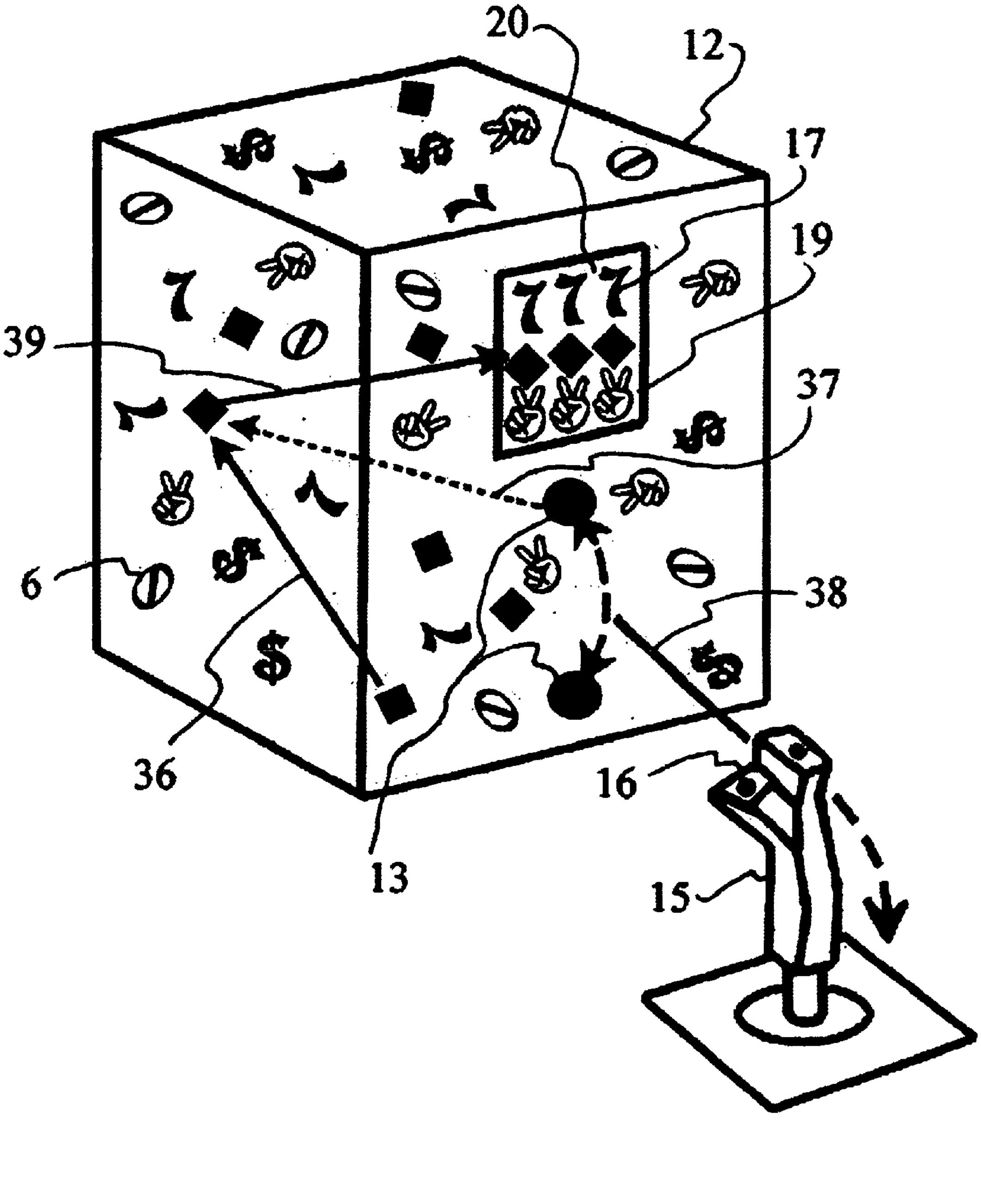
FIG. 2 is an isometric exterior view of the virtual gaming area 12, image actions, and human interface device effects according to the invention.

FIG. 2 is an isometric view of a software generated virtual world according to the present invention. All of the applicable element indication numbers used in FIG. 1 are also used in FIGS. 2, 3, and 4 for clarification. As appropriate, additional numbers are used in each figure to further describe elements of the invention. Gaming area 12 is indicated in FIG. 2 as a six-surfaced cube within which images 6 are generated from image bank 11. Image 6-trajectory indication line 36 shows a typical path of any image 6 through gaming area 12 as determined the random target trajectory line features of software program 5. It is an attribute of the invention that any image 6 may be given any random motion path within the gaming area 12.

Figure 3:
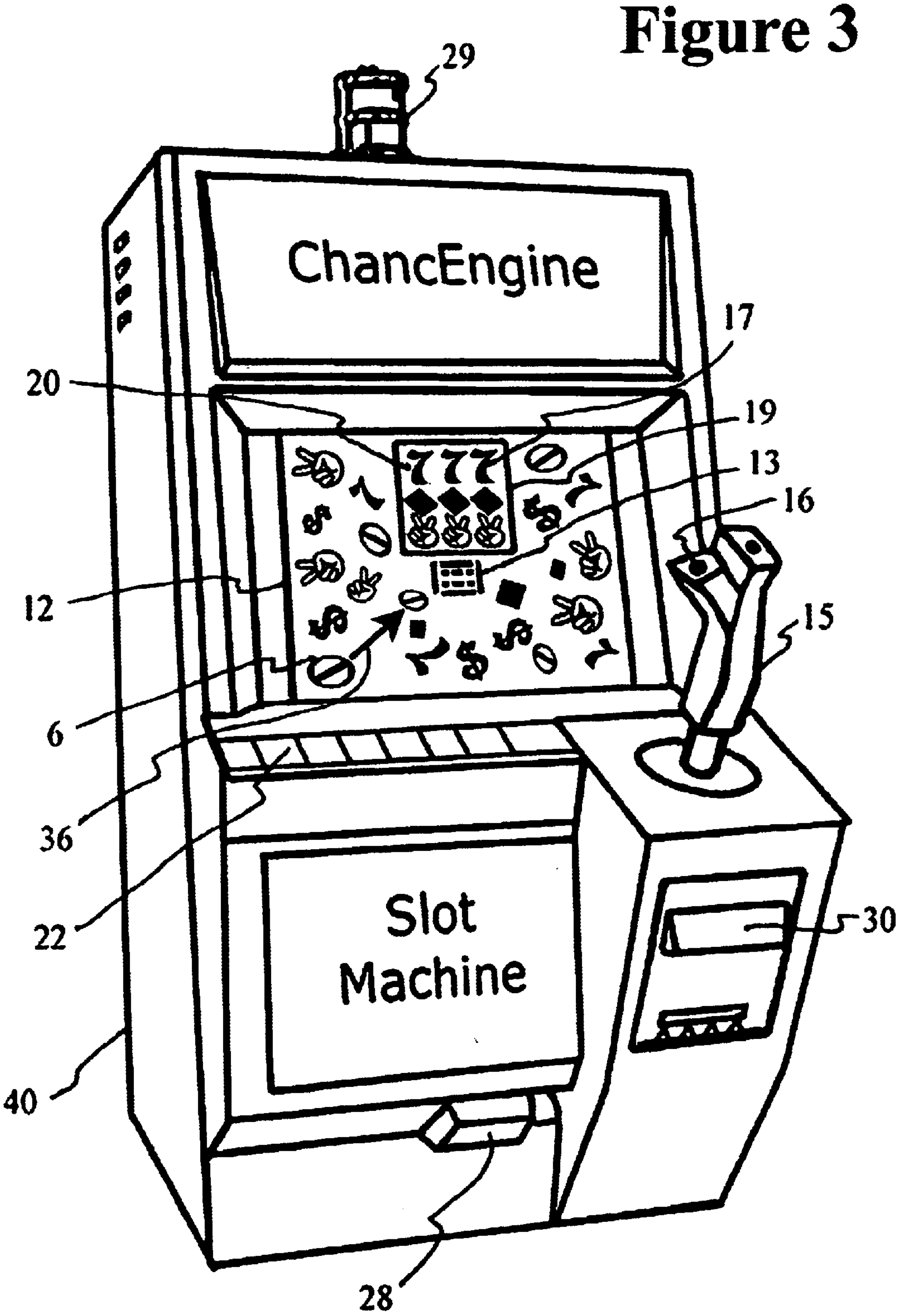
FIG. 3 is an exterior view of a hardware configuration of a gaming apparatus according to the invention.

Referring now to FIGS. 1, 2, and 3, an image bank 11 is provided within said software program 5 that acts as a library from which a random number generator 14 draws images 6 to present within gaming area 12 on display means 18. Said random number generator(s) 14 are common in prior art, and established by gaming regulation agencies to comply with a given rate of payback. It is an aspect of the present invention that its software program 5 is configured to accept any allowable random number generator database as the mathematical rule set for the incorporated random number generator(s) 14 and pay table(s) 26. Multiple random number generators and pay tables may be incorporated into the present invention. The trajectory initiation, direction, and termination functions of images 6 along any trajectory indication line 36 are software configurable as either fixed or random positions within and throughout gaming area 12. Software program 5 is configured with an algorithm to provide virtual Target slider 23, the position of which along a sliding scale, determines the total number of available image 6 targets from 1 or more. Realistically, a player can only react to an image 6-target array incorporating between twenty-five and two hundred fifty image 6 targets.

Referring to FIGS. 2 and 3, as a player inputs command signals through human interface device 15 to the software program 5 operating within computer 8, player point of view 38 through cursor 13 is altered with respect to any image 6 within gaming area 12, thus providing said player the experience of immersion in the gaming environment. Human interface device 15 may be a joystick, trackball, touch screen, button, or other human interface means as the player control means integrated within any gaming device chassis 40 well known in prior art.

The player may then position cursor 13, generated by the game software 5, over an image 16, and input a command signal using a trigger 16 incorporated into human interface device 15. During this time, various sound effects may be generated by the sound generator 24 component of software program 5, and applied to the loudspeaker 27 from a typical sound feature incorporated into computer 8. Additionally, various lights 29 on the gaming apparatus may be flashed to provide more player interest.

When a player interacts with an image 6 by aligning cursor 13 over said image 6, and pressing trigger 16, collision detection path 37 algorithms within software program 5 may then use said image 6 to activate a second random number generator 14 action that draws on the same image bank 12 to create a second image 17. Image 6 may then disappear, and reappear as a secondary image 17. This secondary image 17 may then be displayed as a series of cycled images in a manner representative of a typical slot machine image display as shown in grid 19 and virtual slot reel 20 in FIGS. 2 and 3. In a chance based gaming apparatus, an image 16 may or may not reappear as the same image in its new position as defined by an image 17.

The primary to secondary image transition line 39 indicates this shift of image positions from one point to another within gaming area 12. For example, a secondary image 17 or series of images 17 may first be displayed in the upper left corner of a grid 19. As each new image 17 is rendered, it may be placed within said grid 19 until grid 19 is completely filled with the appropriate number of images 17 required to complete a win or loss condition as defined by pay table 26—as applied to the win or loss functions of the game by software program 5. Further, the trajectory initiation, direction, and termination functions of any secondary image (s) 17 are software configurable within the invention software program 5 as either fixed or random positions within and throughout gaming area 12, and, as such, may be presented in another layout than that herein described as grid 19.

The primary image 6 and secondary image 17 may be playing card images, slot reel images, gemstone images, stellar body images, traffic sign or symbol images, numerical images, or any other image or symbol. Further, in the application and use of the present invention, it may be desirable that more than one primary image 6, or more than one secondary image 17 is displayed at any given time. Software program 5 may also be configured such that if a player does not react to an image 6, or an image 17, within a predetermined time frame, the software program 5 may be configured with algorithms to automatically complete the game for the player.

After all the image(s) 17 are lined up in grid 19, software program 5 may compare the image 17 position information with winning image combinations stored in pay table 26. These winning combinations may include fixed winning image layout combinations corresponding to typical symbols on any typical gaming machine virtual slot reel in prior art such as a bell, plum, melon, star, etc., as well as any additional image options generated by a random number generator 14 from an image bank 11. The grid 19 may also include any one or more images 17 to represent a virtual slot reel 20. Although three-symbol bearing reels are shown in FIGS. 2 and 3, it should be understood that more or fewer reels could be used. If an image match occurs, the value of that match, previously stored in memory, is looked up in pay table 26 and the appropriate amount of currency or credits are applied to the winner's currency or credit balance. Said pay table 26 is common in prior art, and established by gaming regulation agencies to comply with a given rate of payback. It is an aspect of the present invention that its software program 5 be configurable to accept any allowable pay table database as the mathematical rule set for the incorporated random number generator(s) 14.

The invention, as described herein, and further detailed in FIGS. 1, 2, 3, and 4, may also be used to provide a combination skill and chance based experience. A player may initiate a game as detailed in the foregoing descriptions for FIGS. 1, 2, and, 3. However, in the skill based game configuration, when a player interacts with an image 6 through human interface device 15, said image 6 may be rendered in grid 19 without the cycling effect of random number generator 14 applied to image library 12. For example, if the player aims at an image 6 representation of a lemon with the cursor 13 with human interface device 15, said lemon image 6 may disappear from the gaming are 12 and reappear in a new position in grid 19. The present invention provides a skill slider 25 function as a subcomponent of software program 5 to selectively apply the effect of a player's skill to the win or loss outcome of a game of chance by varying the effect of random number generator 14 on the image 6 and image 17 display, and, thereby selectively determining the effect of a player's skill on the win or loss outcome of a game of chance. The variable skill versus chance characteristics of the present invention are ideal for online, internet, LAN, and other multi-player applications of the invention, as well as the incorporation of the invention into an existing game of chance as a second level or second chance game in a typical prior art video game of chance.

Referring now to FIG. 3, there is shown a gaming apparatus according to the invention. To operate the device, a player may insert one or more coins or tokens into coin slot 30. The microprocessor 9 stores the number of tokens detected by the coin sensor 31 for later use in calculating a payout that may result from the game. When the game apparatus is actuated by insertion of credits or currency, the microprocessor 9 in computer 8 may sense the deposit of a coin via a coin sensor 31 and enable the game software program 5 and human interface device(s) 15 in response thereto. The player may then pull a handle 21, or press a button 22. Pulling the handle 21 or pressing a button 22 may cause the random number generator 14 to generate one or more target images 6 along trajectory indication line 36. The player may interact with image(s) 6 with human interface device 15 and trigger 16, causing the software program 5 to generate secondary image(s) 17. Secondary images 17 may begin filling up grid 19 to emulate a virtual slot reel 20. After said image(s) 17 stop cycling, a random combination of static image 17 symbols may appear within grid 19. If the combinations of symbols match one of the pay table 26 defined combinations, a win may occur and the machine may dispense a predetermined number of tokens from payout chute 28.

Figure 4:
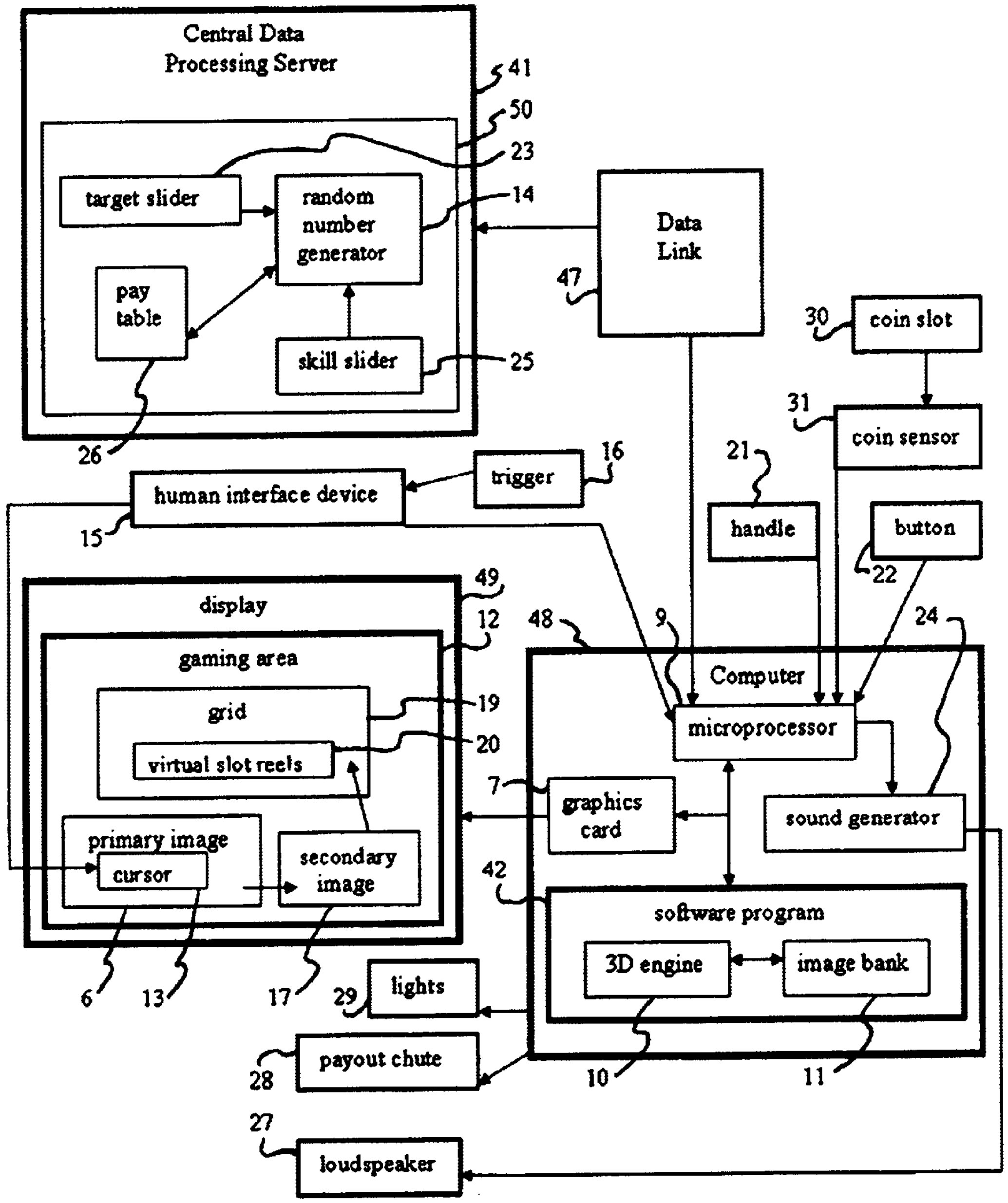
FIG. 4 is a logical block diagram of an alternative gaming apparatus according to the invention providing multiple player capability.

Another embodiment of the present invention as described in FIG. 4 provides multiple player gaming capabilities within a local or extended environment. A video gaming system may include a central data processing server 41 that is connected to a plurality of remote gaming computer(s) 48 and associated display(s) 49 through a data link 47. Said central data processing server 41 may be a computer identically configured as computer 8 is described in FIG. 1, or any other computer compatible with, and powerful enough to run server software 50. Said remote gaming computer(s) 48 may be computers identically configured as computer 8 is described in FIG. 1, or any other computer compatible with, and powerful enough to run client software program 42. Said data link 47 may be the Internet, a LAN, or any other telecommunications ready electronic network.

Each of the remote gaming computer(s) 48 may have a display 49, a coin slot 30 for receiving currency to activate the system and a payout chute 28 to provide a reward to the player. However, it is not required that the remote gaming computer(s) 48 be outfitted with these currency elements. In typical online gaming scenarios, credits and currency transactions are often handled through electronic means. The invention as described herein is intended for application in said online gaming scenarios. A player at each of the remote gaming computer(s) 48 may be presented with an identical randomly generated image 6 or series of images 6 within gaming area 12 on display 49 means.

All of the players may then individually interact with images 6 through human interface means 15 coupled to remote gaming unit 4. The timing of each player's interaction with, as well as the position of image 6 at said time of interaction, may then be transmitted to the central data processing station 41 by client software program 42 on remote gaming computer(s) 48. These interactions may then be analyzed by server software 50 on central data processing server 41, and the proper winning interaction or interactions determined by an algorithm that compares all said player interactions, or set of interactions. All of the remote gaming computer(s) 48 may then be provided with win/loss information with respect to each set of interactions from the central data processing station 41 through data link 47. Each individual remote gaming computer(s) 48 may then responds to said win/loss information and provide the player a gain or reduction in credits or currency.

All of the image generation capabilities and game characteristics embodied within software program 5 are actually incorporated within server software 50 on central data processing station 41 and the client software program 42 on remote gaming computer(s) 48—but said image generation capabilities and game characteristics are divided between the two systems. In a multi-player environment, certain tasks that are normally handled by one software program are necessarily split up between several software programs, and several pieces of hardware. For example, in a multi-player configuration, server software 50 may house the random number generator 14, target slider 23, skill slider 25, and pay table 26, which may transmit image generation data over data link 47 to client software program 42. Client software program 42 would then use 3D engine 10 to render images 6 from image bank 11 on remote gaming computer 48 to display 49. Human interface device 15 and trigger 16 in the multi-player configuration described in FIG. 4, would be used in the same way as the embodiment of the invention as described in the specification for FIGS. 1, 2, and 3, but it would be coupled to remote gaming computer 48, and through client software program 42, would provide target image 6 interaction data to central dat processing server 41 over data link47. The pay table 26, incorporated into server software 50, would activate the payout functions on client software program 42 to enable payout chute 28 functions as controlled by remote gaming computer 48.

Having thus described exemplary embodiments of the present invention, it should be noted by those skilled in the art that the within disclosures are exemplary only and that various other alternatives, adaptations, and modifications may be made within the scope of the present invention. Although the present invention has been described in connection with details of the preferred embodiment, many alterations and modifications may be made without departing from the invention. Accordingly, it is intended that all such alterations and modifications may be considered as within the spirit and scope of the invention as defined in the appended claims.

I claim:

1. A Video Slot Game Of Chance Apparatus comprising, in combination:

at least one means to accept currency or a currency equivalent from a player;

a computer means, a first computer program product, said computer program residing on a computer readable medium on said computer means, and configured to generate a virtual three-dimensional world drawn from a first library of visual elements contained within said first computer program, and to present said three dimensional world to a player on a visual display means;

at least one random number generator program interfaced to said computer program, and configured to direct said computer program to randomly generate a plurality of primary images drawn from a second library of visual elements contained within said first computer program within said virtual three dimensional world;

a first player control means interfaced to said computer means, and configured to allow a player initiated control input to alter said player's point of view relative to said plurality of primary images within said virtual three-dimensional world in real time in a visually fluid manner;

a second player control means interfaced to said computer means, and configured to allow player interaction with said plurality of primary images within said virtual three-dimensional world;

said random number generator program being further configured to direct said computer program to randomly generate at least one secondary image drawn from said second library of visual elements contained within said first computer program in response to said player interaction with said plurality of primary images though said second player control means;

said random number generator program additionally being further configured to direct said computer program to establish a win or loss condition as a result of, and subsequent to, said player interaction with said at least one primary image or said at least one secondary image;

said random number generator program being further configured to direct said computer program to establish a currency or currency equivalent payout as a result of said player interaction with said primary image or said secondary image; and at least one means to return said currency or a currency equivalent payout to a player in response to said win or loss condition.

2. A Video Game Of Chance Apparatus in accordance with claim 1 that provides at least one means to present said plurality of primary images being displayed in either a fixed position, or moving along a defined or random trajectory.

3. A Video Game Of Chance Apparatus in accordance with claim 1 that provides at least one means to present said at least one secondary image being displayed in either a fixed position, or moving along a defined or random trajectory.

4. A Video Game Of Chance Apparatus in accordance with claim 1 that provides at least one means to apply the effect of a player's skill to the win or loss outcome of a game of chance.

5. A Video Game Of Chance Apparatus in accordance with claim 1 that provides at least one means to determine the effect of a player's skill on the win or loss outcome of a game of chance.

6. A Video Game Of Chance Apparatus in accordance with claim 1 that provides at least one joystick, trackball, touch screen, button, or other human interface means as the player control means for allowing player interaction with said plurality of primary images, or said at least one secondary randomly generated image within said virtual three-dimensional world.

7. A Video Game Of Chance Apparatus in accordance with claim 1 that provides at least one means to allow more than one player to simultaneously participate in a game of chance.

8. A Video Game Of Chance Apparatus in accordance with claim 1 that provides at least one means to generate said plurality of primary images from a library of images located in said second library of visual elements.

9. A Video Game Of Chance Apparatus in accordance with claim 1 that provides at least one means to generate said at least one secondary image from a library of images located in said second library of visual elements.

10. A Video Game Of Chance Apparatus in accordance with claim 1 that provides at least one means to generate and display a variable sized virtual three-dimensional world as said virtual three-dimensional world.

11. A Video Game Of Chance Apparatus in accordance with claim 1 that provides at least one means to incorporate at least one internal or external random number generator database or pay table.

12. A Video Game Of Chance Apparatus in accordance with claim 1 that is incorporated into an existing game of chance style gaming device as a second level or second chance game, a secondary event, or a bonus type game.

13. A Video Game Of Chance Apparatus in accordance with claim 1 that provides means for generating a random combination of symbols, means defining a plurality of winning combinations of symbols and means responsive to said random combination generating means and to said winning combination defining means for providing an indication of a win whenever the generated random combination corresponds to one of said winning combinations.

14. A Video Game Of Chance Apparatus in accordance with claim 13 wherein said random combination generating means includes display means for sequentially displaying a plurality of combinations of predefined symbols corresponding to both the defined winning combinations and said player selected winning combination.

15. A Video Game Of Chance Apparatus in accordance with claim 1 wherein said primary and secondary images are playing card images.

16. A Video Game Of Chance Apparatus in accordance with claim 1 wherein said primary and secondary images are slot reel images.

17. A Video Game Of Chance Apparatus in accordance with claim 1 wherein said primary and secondary images are gemstone images.

18. A Video Game Of Chance Apparatus in accordance with claim 1 wherein said primary and secondary images are stellar body images.

19. A Video Game Of Chance Apparatus in accordance with claim 1 wherein said primary and secondary images are traffic sign or symbol images.

20. A Video Game Of Chance Apparatus in accordance with claim 1 wherein said primary and secondary images are numerical images.

21. A Video Game Of Chance Apparatus in accordance with claim 1 wherein more than one primary image is displayed.

22. A Video Game Of Chance Apparatus in accordance with claim 1 wherein more than one secondary image is displayed.

23. A Video Game Of Chance Apparatus in accordance with claim 1 wherein, if the player does not react to said image in a predetermined time frame, the game software may automatically complete the game.

24. A Video Game Of Chance Apparatus in accordance with claim 1 which provides apparatus for accommodating at least one player at a remote location, said apparatus comprising:

a central data processing server;

at least one remote gaming computer;

a two-way data link connecting said central data processing server to said remote gaming computer;

said remote gaming computer having:

means for receiving image generation and position data from said central data processing station;

means for displaying images generated from said image generation and position data;

means for inputting a response from a player to the image generation and position data;

means for transmitting said response to said image generation and position data to said central data processing server over said data link, and said central data processing server having:

means for receiving said responses to said image generation and position data over said data link from said remote gaming computer;

means for comparing said responses from more than one remote gaming computer to determine the win or loss condition of said remote gaming computers; and means for transmitting a win or loss condition signal to said remote gaming computers.

* * * * *